May 12, 1931. C. DE MARCHI 1,804,972
WATER VEHICLE
Filed April 28, 1930 2 Sheets-Sheet 1

INVENTOR.
CARLOS DE MARCHI
BY
ATTORNEYS.

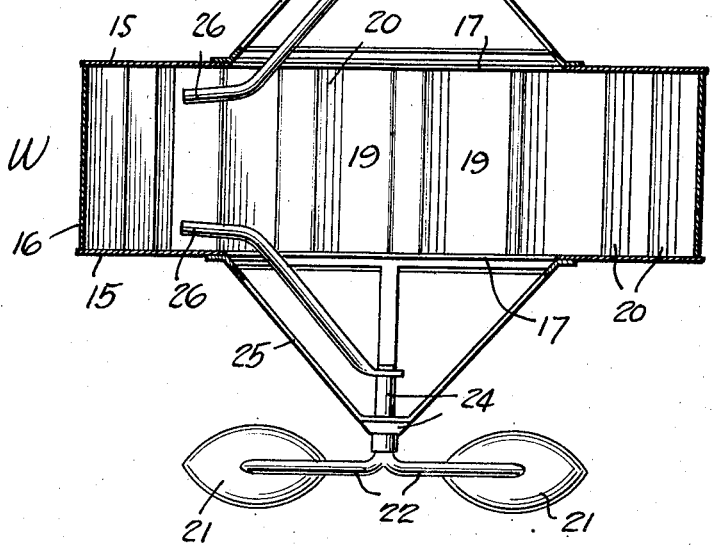
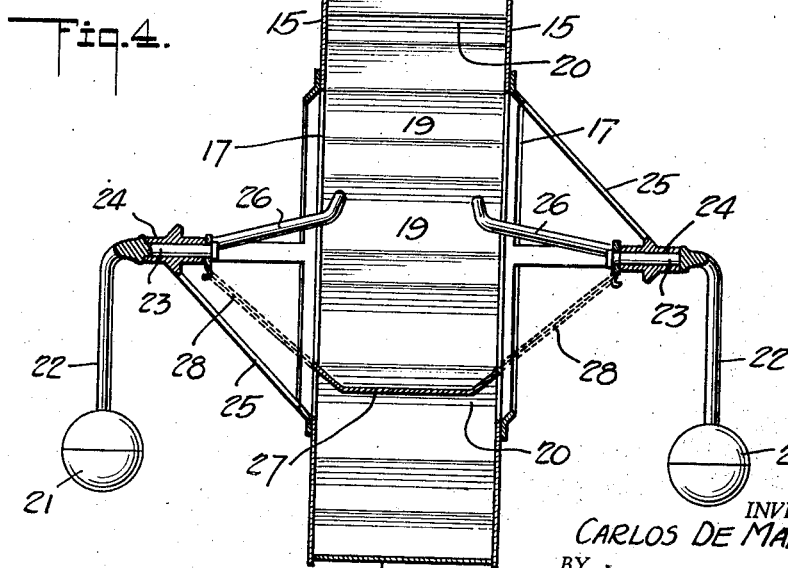

Patented May 12, 1931

1,804,972

UNITED STATES PATENT OFFICE

CARLOS DE MARCHI, OF LOS ANGELES, CALIFORNIA

WATER VEHICLE

Application filed April 28, 1930. Serial No. 448,047.

My invention relates to water vehicles, and it has for a purpose the provision of a water vehicle which is characterized by a propelling wheel supported in upright position on the water by means of pontoons or the like, and which is rotatable by an operator positioned in the wheel and to thus cause the vehicle to move over the water.

It is also a purpose of my invention to provide a water vehicle of the type above specified in which the propelling wheel has a bladed outer periphery, and a stepped inner periphery by which the operator can propel the wheel by the act of walking.

I will describe only one form of water vehicle embodying my invention, and will then point out the novel features thereof in claims.

Figure 1:
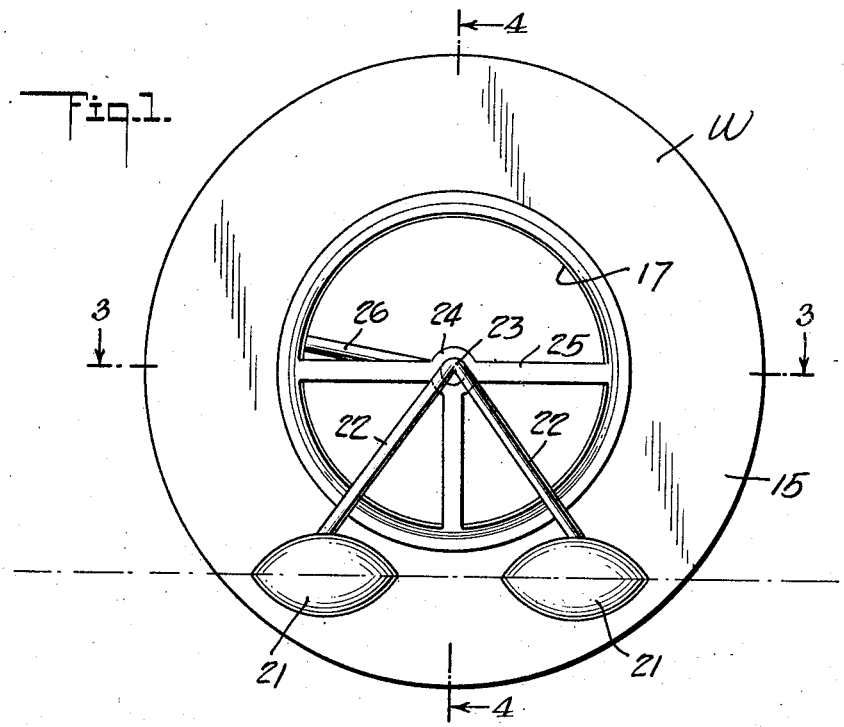
Fig. 1 is a view showing in side elevation one form of water vehicle embodying my invention.

Figs. 3 and 4 are sectional views taken on the lines 3—3 and 4—4, respectively, of Fig. 1 and looking in the direction of the arrows.

In carrying out my invention, I provide a wheel, designated generally at W, which is of a width and diameter to accommodate a person therein, as the person is designed to operate the wheel from within in effecting propulsion of the vehicle. This wheel may be made of metal or any other suitable material, and it comprises side walls 15 and a rim 16, the side walls being formed with openings 17 through which the operator is adapted to enter and leave the wheel, and such openings being sufficiently spaced from the rim of the wheel to preclude the entrance of water into the wheel. The rim 16 is constructed to provide upon its outer periphery an annular series of blades 18 all of which extend in the same direction about the wheel so that when the wheel is rotated in the direction of the blades, the blades will operate to propel the wheel and in a manner to cause the wheel to roll on the surface of the water. As a consequence of forming the blades on the outer side of the rim, there is formed on the inner side of the rim an annular series of steps 19, the tread surface of which are serrated or otherwise roughened, as indicated at 20, to prevent the feet of the operator from slipping from the steps when in the act of propelling the wheel.

The wheel W is adapted to be supported in upright position on the surface of the water so that the blades are in contact with the water at the lowest point of the wheel by means of pontoons 21 preferably arranged in pairs at opposite sides of the wheel with each pair fixed to the lower ends of a pair of arms which converge and are secured to an axle 23 journaled in a bearing 24 of a frame 25 consisting of a plurality of arms extending outwardly from the wall of the opening 17 at the corresponding side 15. Extending inwardly from each axle 23 is a bar 26, the inner ends of both of the bars terminating within the wheel W and in spaced relation to each other so that they may be gripped by the hands of the operator to steady himself during operation of the wheel.

A seat 27 is supported within the wheel W by means of chains 28 secured to the inner ends of the axles 23. This seat is for the operator of the vehicle, and may be occupied by him during his operation of the vehicle or not as he may desire.

Figure 2:
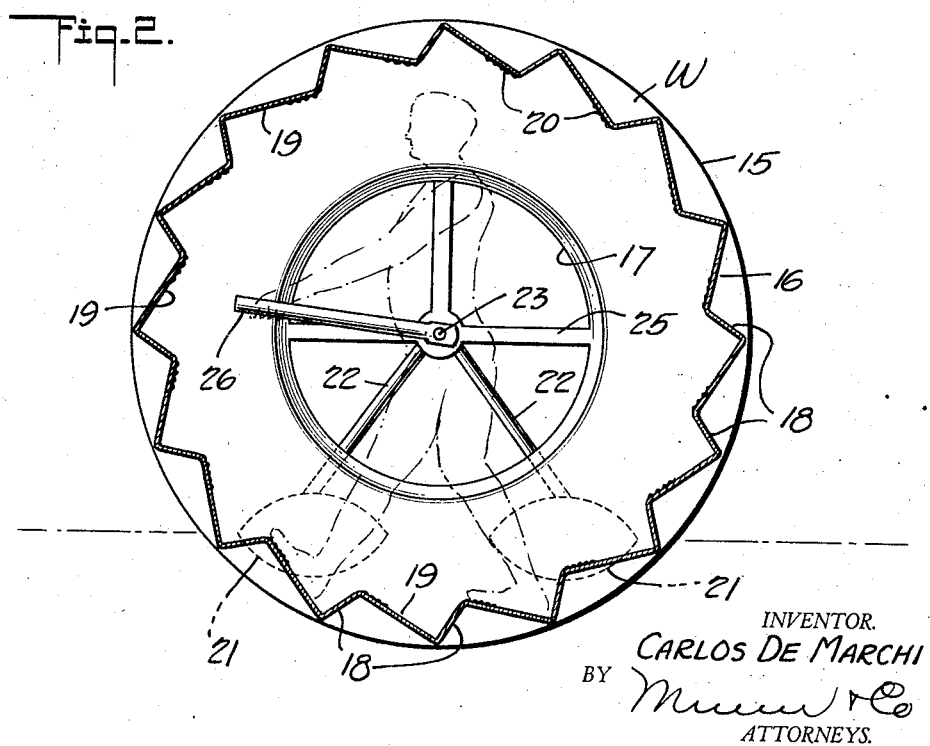
Fig. 2 is a vertical section of the water vehicle shown in Fig. 1, and illustrating in dot and dash lines the position of the operator in the wheel when in the act of propelling the wheel.

In practice, the operator is positioned within the wheel W in the manner illustrated in dot and dash lines in Fig. 2, and by moving his legs as in the act of walking, first one foot and then the other is applied to the steps 19, and under the weight of the operator imposed upon the steps the wheel is set into rotation about the axles 23 as a center. Naturally under rotation of the wheel, the blades 18 are caused to move through the water to effect propulsion of the wheel in such manner that the latter rolls on the surface of the water. During propulsion of the wheel, the operator grips the handle-bars 26 to steady himself and also to manipulate the pontoons in such a manner as to effect steering of the vehicle. This steering may be effected by moving the bars 26 upwardly and downwardly thereby causing the rotation of the axles to lower or elevate one float or the other of each pair, and it will be understood that by operating the floats in this manner the resistance offered to the progress of the wheel at either side thereof can be increased or decreased at will, thereby causing the wheel to be steered to one side or the other.

From the foregoing description taken in conjunction with the accompanying drawings, it will be manifest that I have provided a water vehicle which is seaworthy in that the wheel is maintained upright at all times by reason of the pontoons, and a water vehicle which is capable of being operated by a person in the act of walking, and through the manipulation of the pontoons to effect steering of the vehicle so that it may be propelled in any direction desired.

Although I have herein shown and described only one form of water vehicle embodying my invention, it is to be understood that various changes and modifications may be made herein without departing from the spirit of the invention and the spirit and scope of the appended claims.

I claim as my invention:

1. A water vehicle comprising pontoons, a wheel mounted upon the pontoons for rotative movement, means on the wheel for for imparting rolling movement thereto on the water when rotated, and foot operated means fixed on the inner periphery of the wheel by which the latter can be rotated.

2. In a water vehicle, a wheel having blades on its outer periphery and steps on its inner periphery.

3. In a water vehicle, a wheel having its rim formed to provide blades on the outer periphery of the wheel and steps on the inner periphery.

4. A water vehicle comprising a wheel which is hollow to accomodate an operator, blades on the outer peripherp of the wheel, means for supporting the wheel in upright position on the surface of the water and so that only a portion of the wheel has contact with the water, and steps on the inner periphery of the wheel upon which the operator is adapted to tread for rotating the wheel to actuate the blades and thus propel the wheel over the surface of the water.

5. A water vehicle comprising a wheel, pontoons for supporting the wheel for rotative movement on the surface of the water, means on the wheel by which the latter may be propelled, and means for connecting the pontoons to the wheel so that they are relatively movable in a manner to effect steering of the wheel.

6. A water vehicle comprising a wheel which is hollow to accomodate an operator, blades on the outer periphery of the wheel, pontoons for supporting the wheel on the surface of the water, axles carried by the pontoons and about which the wheel is adapted to rotate, means in the wheel by which the latter can be rotated by the operator, and means connected to the axles by which the pontoons may be moved to steer the wheel.

7. A water vehicle comprising a wheel which is hollow to accommodate an operator, blades on the outer periphery of the wheel, steps in the inner periphery of the wheel, frames on opposite sides of the wheel, axles journaled in the frames, pontoons carried by the axles and bars carried by the axles by which the pontoons may be moved about the axles as a center.

CARLOS DE MARCHI.